United States Patent

Tai et al.

[11] Patent Number: 6,119,059
[45] Date of Patent: Sep. 12, 2000

[54] ADVANCED WARNING DEVICE FOR MONITORING THE WORKING CONDITIONS OF HYDRAULIC BRAKES SYSTEM OF MOTOR VEHICLES

[75] Inventors: Chi-Fu Tai, Yung-Ho; Shih-Hsiung Wu, Taipei; Chung-Yun Gau, San-Chung; Shuo-Jen Lee; Ke-Feng Lin, both of Taipei, all of Taiwan

[73] Assignee: Institute Of Occupational Safety And Health, Council Of Labor Affairs, Executive Yuan, Taipei, Taiwan

[21] Appl. No.: 09/048,046

[22] Filed: Mar. 26, 1998

[51] Int. Cl.[7] .................................................. G06F 17/00

[52] U.S. Cl. ................. 701/29; 303/122.03; 303/122.09; 324/694; 340/452; 340/453; 701/70

[58] Field of Search .................................... 701/1, 29, 31, 701/36, 70, 76; 303/2, 3, 122, 122.02, 122.03, 122.09, 122.12, 122.13, 122.14, 191, DIG. 1, DIG. 3; 340/449, 450.1, 452, 453; 188/1.11 E, 76.1, 1.11 W, 264 D, 264 F; 324/694, 698, 700, 716; 374/44, 135, 153

[56] References Cited

U.S. PATENT DOCUMENTS

| | | | |
|---|---|---|---|
| 4,020,454 | 4/1977 | Malonee | 340/453 |
| 4,649,370 | 3/1987 | Thomason | 188/1.11 R |
| 4,753,492 | 6/1988 | Leiber et al. | 303/DIG. 3 |
| 4,790,606 | 12/1988 | Reinecke | 303/191 |
| 4,964,679 | 10/1990 | Rath | 303/146 |
| 5,028,144 | 7/1991 | Klein | 374/44 |
| 5,136,508 | 8/1992 | Bannon et al. | 701/70 |
| 5,613,744 | 3/1997 | Eslinger et al. | 303/191 |

Primary Examiner—William A. Cuchlinski, Jr.
Assistant Examiner—Edward Pipala
Attorney, Agent, or Firm—Bacon & Thomas, PLLC

[57] ABSTRACT

An advance warning device for monitoring the working conditions of a hydraulic braking system of a motor vehicle is composed of a plurality of sensors and a controller in communication with the sensors for processing the signals transmitted by the sensors so as to provide the operator of the motor vehicle with an advance warning signal as to likelihood of the brake failure. The sensors are intended to monitor respectively the temperature of the brake lining piece, the temperature of the brake fluid kept in the distribution pump, the water content of the brake fluid of the hydraulic braking system, and the hydraulic pressure of the hydraulic braking system.

16 Claims, 10 Drawing Sheets

ADVANCED WARNING DEVICE FOR MONITORING THE WORKING CONDITIONS OF HYDRAULIC BRAKES SYSTEM OF MOTOR VEHICLES

FIELD OF THE INVENTION

The present invention relates generally to a hydraulic braking system of the motor vehicle, and in particular to a device for monitoring the working conditions of the hydraulic braking system of the motor vehicle so as to provide the operator of the motor vehicle with an advance warning signal as to the likelihood of a mechanical failure of the hydraulic braking system.

BACKGROUND OF THE INVENTION

According to the inductive analyses done by the inventors of the present invention and others, the factors contributing to the mechanical failure of the hydraulic braking system of an automotive vehicle include a lock-up phenomenon, a poor wiring of the hydraulic brake fluid line, the poor quality of a brake lining piece or an improper fastening of the brake lining piece, a leak problem of the hydraulic brake fluid, the problems resulting from the excessively high temperature of the component parts of the hydraulic braking system, the poor quality of the hydraulic brake fluid, and so forth. Certain models of the automotive vehicle are equipped with the anti-lock brake system (ABS) for averting the problems as to the lock-up phenomenon. The poor wiring of the hydraulic brake fluid line is a design problem and is often confined to certain models made by certain automotive vehicle manufacturers. The poor quality of the brake lining piece or the improper fastening of the brake lining piece can undermine the braking efficiency and result in the overheating of the braking system. The leak problem of the hydraulic brake fluid can directly result in the oil pressure deficiency which can cause the mechanical failure of the braking system. The heat generated by the mechanical friction between the brake lining piece and the brake drum or disc can bring about a reduction in brake force of the brake lining piece, thereby resulting in the failure of the braking system. In addition, the failure in the braking system may be caused by an incident in which the hydraulic pressure is not established in time in view of a phase change in the brake fluid products. In other words, the hydraulic brake fluid plays a very important role in the braking efficiency. There are several brands of hydraulic brake fluids of high quality, which meet the standard requirements, such as SAE, FMVSS, DOT, and the like. However, the performance of such high-quality hydraulic brake fluids can be adversely affected by a gradual increase in the water content of the hydraulic brake fluid after the prolonged operation of the motor vehicle in question. The increase in the water content of the hydraulic brake fluid can cause a reduction in the boiling point of the hydraulic brake fluid, thereby resulting in the deficiency of the hydraulic pressure.

SUMMARY OF THE INVENTION

The primary objective of the present invention is therefore to provide an advance warning system to monitor the working conditions of the hydraulic braking system of a motor vehicle such that the operator of the motor vehicle is given an advance warning so as to enable the operator to fix the problem in time. In addition, the present invention is provided with an automatic sprinkling system for cooling an over-heated brake drum.

In keeping with the principle of the present invention, the foregoing objective of the present invention is attained by an advance warning device for monitoring the working conditions of the hydraulic braking system of an automotive vehicle. The advance warning device of the present invention consists of a brake lining temperature sensor for measuring the temperature of the brake lining piece at work, a distribution pump temperature sensor for monitoring the temperature of the hydraulic brake fluid contained in the distribution pump, a water content sensor for detecting the water content of the hydraulic brake fluid, a pressure sensor for measuring the pressure of the hydraulic brake fluid, and a controller capable of receiving the signals transmitted from the sensors of the device, comparing the received signals with the stored data, and sending out the advance warning signals. The stored data may be kept in a memory contained in the controller. The memory may be located outside the controller and connected with the controller.

The objective of the present invention is further attained by an advance warning device for monitoring the working conditions of the hydraulic braking system of an automotive vehicle. The device comprises a sensor for monitoring the temperature of a brake lining piece in operation such that a sensing end of the sensor is in contact with the brake lining piece in question. The device further comprises a controller having an input end and an output end. The input end of the controller is connected with a signal output end of the sensor for receiving an output signal of temperature from the sensor. The temperature signal transmitted by the sensor is received and compared by the controller with the stored data to determine if the measured temperature of the brake lining piece remains in an acceptable range. If not, an advance warning signal is transmitted by the output end of the controller. The stored data referred to above are kept in a memory which is contained in the controller or located outside the controller.

The objective of the present invention is still further accomplished by an advance warning device for monitoring the working conditions of the hydraulic braking system of a motor vehicle. The device of the present invention is composed of a water content sensor for monitoring the water content of the hydraulic brake fluid such that a sensing end of the sensor is in contact with the hydraulic brake fluid of the hydraulic braking system of the motor vehicle. The device of the present invention is further composed of a controller having an input end and an output end. The input end of the controller is connected with a signal output end of the water content sensor for receiving a water content signal transmitted by the water content sensor. The water content signal so received by the controller is subsequently compared with the stored data to determine if the water content measured by the sensor remains in a safe range. If not, an advance warning signal is transmitted by the output end of the controller to alert the operator of the motor vehicle. The stored data referred to above are kept in a memory which is located inside or outside the controller.

The objective of the present invention is still further achieved by an advance warning device for monitoring the working conditions of the hydraulic braking system of a motor vehicle. The device of the present invention consists of a sensor for monitoring the hydraulic brake fluid temperature of a distribution pump of the hydraulic braking system such that a sensing end of the sensor is in contact with the hydraulic brake fluid contained in the distribution pump. The device of the present invention further consists of a controller having an input end and an output end. The input end of the controller is connected with a signal output end of the sensor for receiving a temperature signal transmitted by the sensor. The temperature signal is then compared with the stored data by the controller to determine if the temperature of the hydraulic brake fluid contained in the distribution pump at work is acceptable. If not, an advance warning signal is transmitted by the output end of the controller. The stored data mentioned above are kept in a memory which is located inside or outside the controller.

The objective of the present invention is still further attained by an advance warning device for monitoring the working conditions of the hydraulic braking system of a motor vehicle. The advance warning device is made up of a pressure sensor having a sensing end, which is contiguous to a fluid admitting port of the distribution pump of the hydraulic braking system of the motor vehicle such that the sensing end of the pressure sensor is in contact with the hydraulic brake fluid. The advance warning device is further make up of a controller having an input end and an output end. The input end of the controller is connected with a signal output end of the pressure sensor for receiving a pressure signal transmitted by the pressure sensor. The pressure signal is subsequently compared with the stored data by the controller to determine if the pressure of the hydraulic brake fluid remains in the normal range. If not, an advance warning signal is transmitted by the output end of the controller to alert the operator of the motor vehicle. The aforementioned stored data are kept in a memory which is located inside or outside of the controller.

It must be noted here that the water content sensor of the present invention is preferably a resistance-type water content sensor, and that the temperature monitoring sensor of the present invention is a thermocouple, such as a K-type thermocouple.

The present invention is further provided with a sprinkling device having a signal receiving end which is connected with the controller. The sprinkling device is capable of being triggered by an instruction transmitted by the controller to sprinkle a cooling fluid to temper an overheated wheel or brake drum.

The foregoing objectives, features, functions, and advantages of the present invention will be more readily understood upon a thoughtful deliberation of the following detailed description of the present invention with reference to the accompanying drawings.

DETAILED DESCRIPTION OF THE EMBODIMENTS

Figure 19:
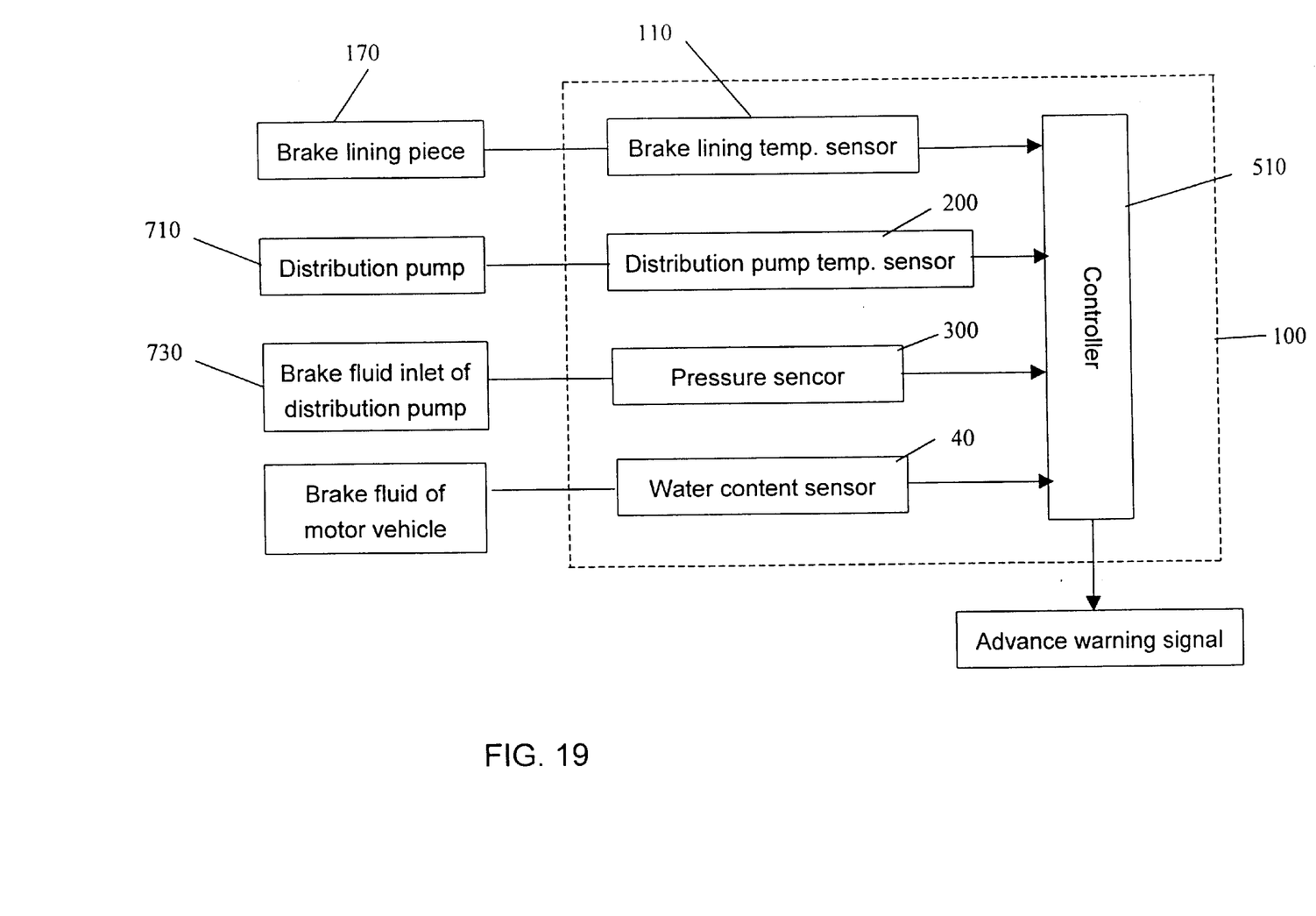
FIG. 19 shows a block diagram of the advance warning device of the present invention.

As illustrated in FIG. 19, an advance warning device 100 embodied in the present invention is intended for use in monitoring the hydraulic braking system of a wheeled motor vehicle so as to alert the operator of the wheeled motor vehicle the likelihood of an eminent mechanical failure of the hydraulic braking system. The advance warning device 100 of the present invention consists of the component parts which are described hereinafter.

A brake lining temperature sensor 110 has a sensing end, which is in contact with a brake lining piece 170 for monitoring the temperature of the brake lining piece 170.

A distribution pump temperature sensor 200 has a sensing end, which is in contact with the hydraulic brake fluid contained in a distribution pump 710 for monitoring the temperature of the hydraulic brake fluid.

A pressure sensor 300 has a sensing end, which is located in the proximity of a brake fluid inlet 730 of the distribution pump 710 for measuring the pressure of the hydraulic brake fluid.

A water content sensor 40 has a sensing end, which is in contact with the hydraulic brake fluid of the motor vehicle for measuring the water content of the hydraulic brake fluid.

A controller 510 is intended to receive signals transmitted by the sensors 110, 200, 300, and 40. The signals are subsequently compared with the advance warning data kept in the data bank. If necessary, the warning signal is sent out by the controller 510.

The controller 510 is a central processing unit or microprocessor. The data bank is stored in a memory (such as ROM) which is located inside or outside the controller 510.

The operation of the hydraulic braking system of the motor vehicle involves the distribution pump hydraulic pressure, which actuates the brake lining piece to make contact with the wheel drum or disc so as to slow down or stop the wheel in motion. In light of the mechanical friction between the brake lining piece and the wheel drum or disc, a substantial amount of heat is generated in the process such that the temperature of the wheel drum can reach as high as 400° C. or even 500° C. The temperature can reach even higher for a heavy-duty truck, such as construction trucks or trailer-trucks. The persistent high temperature of the wheel drum or disc is rather detrimental to the braking system. For this reason, the brake disc is hollowed out or provided with fins capable of cooling the brake. The physical properties of the brake lining piece are changed by the heat generated by friction. For instance, the friction coefficient ($\mu$) of the brake lining piece decreases as the temperature rises. Such changes in the physical property of the brake lining piece have a profound impact on the braking efficiency. The friction equation is as follows:

$$F = \mu \times N$$

As the application force (N) of the distribution pump remains unchanged, the friction force (F) decreases when the friction coefficient ($\mu$) decreases. Under such a circumstance, the braking force is inadequate. For this reason, this phenomenon is monitored in the present invention. The direct measurement of the friction coefficient ($\mu$) is fact difficult. As a result, the data of the friction coefficient ($\mu$) are provided indirectly by measuring the temperature of the brake lining piece. In other words, when the temperature reaches a critical value, the friction coefficient ($\mu$) of the brake lining piece decreases to a point at which the braking deficiency can take place at any moment. The critical value of the temperature is thus used as an advance warning index. In addition, the temperature of the brake lining piece can increase rapidly in the event that the brake lining piece is not fastened properly, or that the brake and other component parts of the brake are not working properly.

The temperature ranges between 100° C. and 300° C. when the braking system of the motor vehicle works normally. However, the instant temperature of the brake drum or disc can reach as high as 600° C.–700° C. In view of such a high-temperature operating environment, the thermocouple is used a temperature sensor. The K-type thermocouple is recommended. The K-type thermocouple is an alloy of chromium (10%) and nickel (90%) and is resistant to heat (as high as 1200° C.) and corrosion. In addition, the K-type thermocouple has an excellent EMF linearity. Moreover, the EMF of the K-type thermocouple is rather stable when the K-type thermocouple is exposed to air, metal vapor, oxygen, nitrogen, carbon dioxide, etc.

Figure 1:
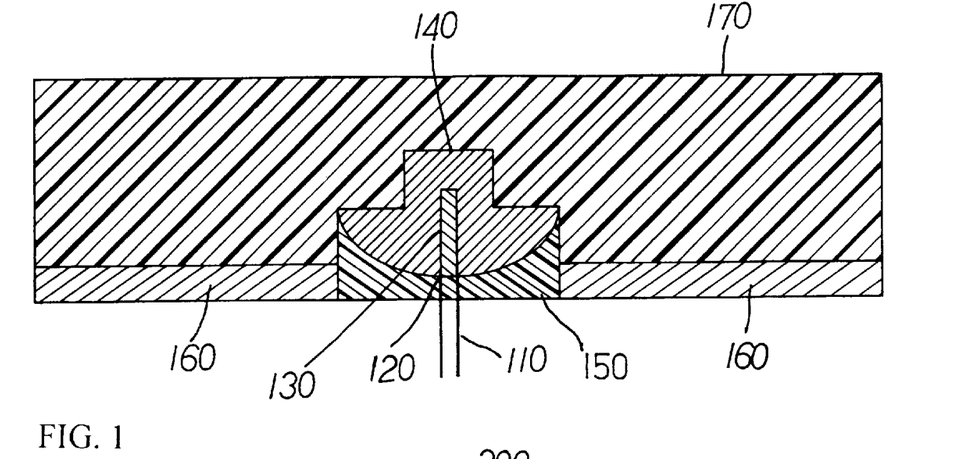
FIG. 1 shows a schematic view of a sensor for monitoring the temperature of a brake lining piece of the hydraulic braking system of a motor vehicle.

The thermocouple is located in the brake lining piece such that the thermocouple is separated from the friction surface of the brake lining piece by a distance (2 mm away from the bottom of the friction material) so as to prevent the thermocouple from being damaged by the mechanical friction of the brake lining piece. As shown in FIG. 1, a brake lining piece 170 has a bottom which is provided with a metal plate 160. The metal plate 160 and brake lining piece 170 are provided in the center thereof with a recess in which a heat conductive metal 140 is disposed. The heat is transmitted from the heat conductive metal 140 to a temperature receiving point 120 of a thermocouple 110. The thermocouple 110 is connected with the heat conductive metal 140 by silver welding 130, which was widely used in welding a thermocouple. The heat conductive metal 140 has a rivet-like shape for preventing the heat conductive metal 140 from being displaced to move toward the friction surface of the brake lining piece by the vibration force which is generated in the midst of the braking action. The recess is filled and the head of the rivet shape thereby covered with a reinforced plastic paste 150 to enclose the heat conductive metal and thermocouple within the recess, and thereby prevent the heat conductive metal 140 and the thermocouple 110 from being separated from the brake lining piece 170.

The parameters of torque, pressure and temperature of the braking action are decisively related to the braking deficiency. It is therefore necessary to determine a critical turning point of temperature at which an advance warning is signaled. For this reason, a dynamometer test was conducted. The test involved the use of DET (L) drum brake. Please refer to CNS-D 3116, CNS-3107, JASO-C 406-82, and JASO-C 438-76 for test standards, on which the test procedures of the present invention are based.

The data obtained in the test include the temperature value, the braking torque value, the hydraulic pressure value. On the basis of torque and hydraulic pressure, the braking efficiency (BEF) and friction coefficient ($\mu$) can be calculated as follows:

$$BEF = \frac{T}{A \times R \times P}$$

$$\mu = U \times \frac{T}{P},$$

$$U = \frac{1}{2 \times A \times r_f}$$

in which T denotes torque; A, cross-sectional area of distribution pump; R, radius of brake drum; P, hydraulic pressure; and $r_f$, effective braking radius.

Figure 2:
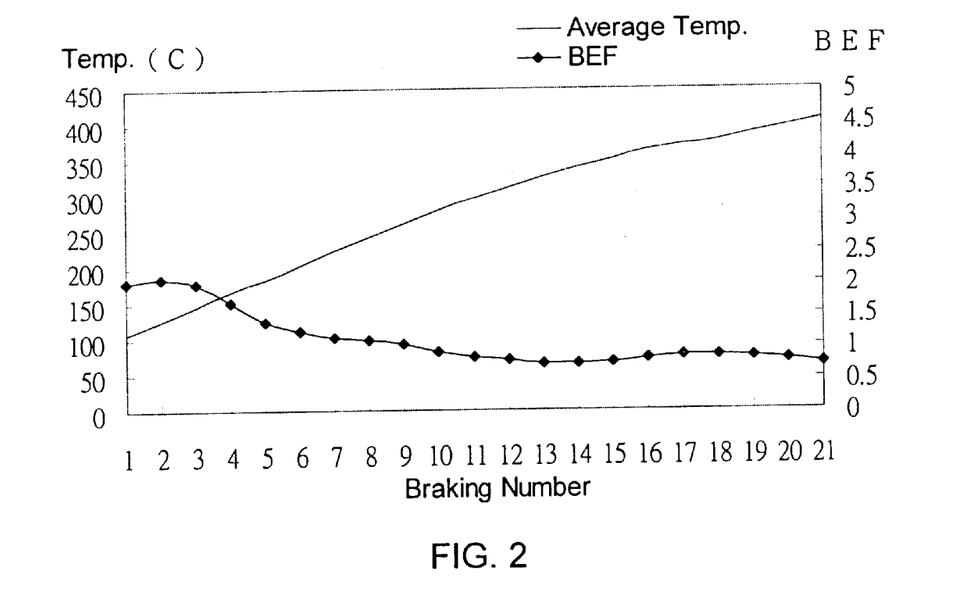
FIG. 2 is a plot showing the relationship between the average temperature and the braking efficiency of the hydraulic braking system of the motor vehicle.
Figure 3:
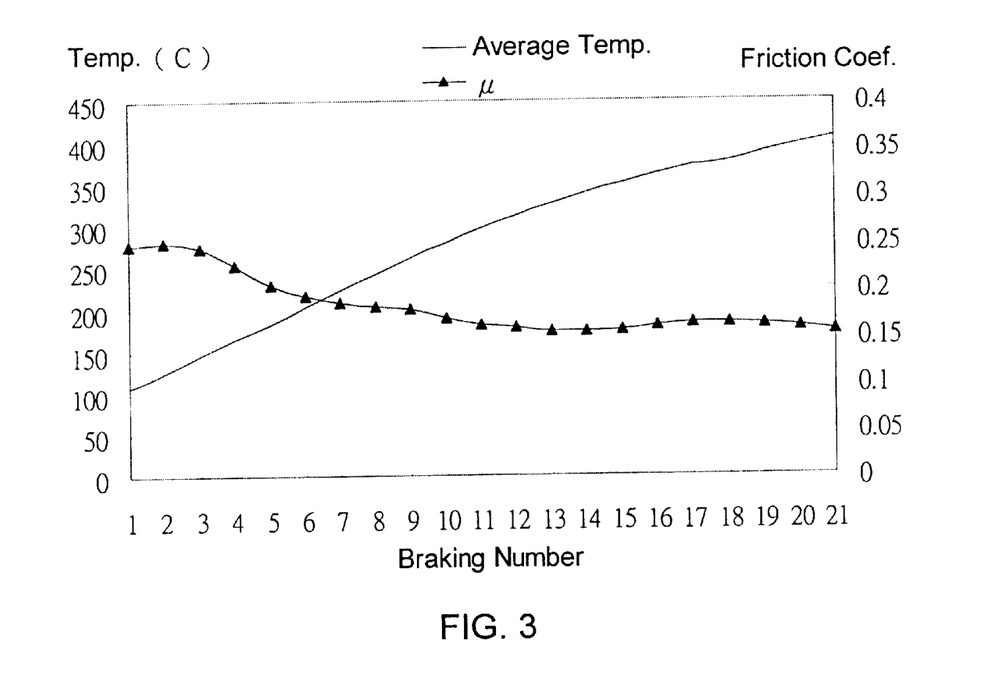
FIG. 3 is a plot showing the relationship between the average temperature and the friction coefficient of the hydraulic braking system of the motor vehicle.
Figure 4:
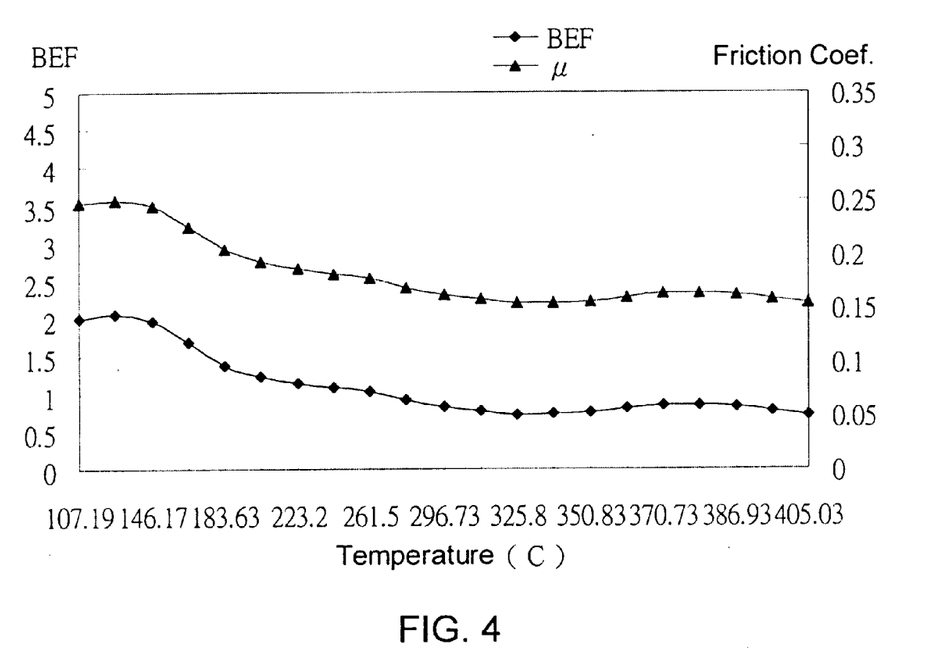
FIG. 4 is a plot showing the braking efficiency and the friction coefficient in relation to the average temperature of the hydraulic braking system of the motor vehicle.

The test results are shown in FIGS. 2–4. The incident of "no braking" took place at the 21st braking attempt (the 420th second). In view of the friction coefficient ($\mu$) being a relatively objective index, the friction coefficient ($\mu$) is related to the braking efficiency (BEF), as shown in FIG. 4.

As illustrated in FIGS. 2, 3 and 4, both braking efficiency (BEF) and the brake lining friction coefficient ($\mu$) decrease rapidly when the temperature keeps rising. When the braking condition is so bad that the braking system is not provided in time with appropriate hydraulic pressure to enable the braking system to have a required braking force (torque), a longer braking distance (time) is therefore called for. This accounts for the incident of "no braking", which took place at the 21st braking attempt in the test referred to above.

As shown in FIG. 3, when the temperature rises from 100° C. to 330° C., the friction coefficient ($\mu$) decreases from 0.25 to 0.154 (a 43% drop). In order to avert the occurrence of the mechanical failure of the braking system, an advance temperature warning index of the brake lining piece of the device of the present invention must be established within this range.

In light of correlation of the braking efficiency (BEF) and the friction coefficient ($\mu$), as shown in FIG. 4, the value of friction coefficient ($\mu$) can be computed on the basis of the BEF values even though the friction coefficient ($\mu$) value can not be measured by the on-line approach.

Figure 5:
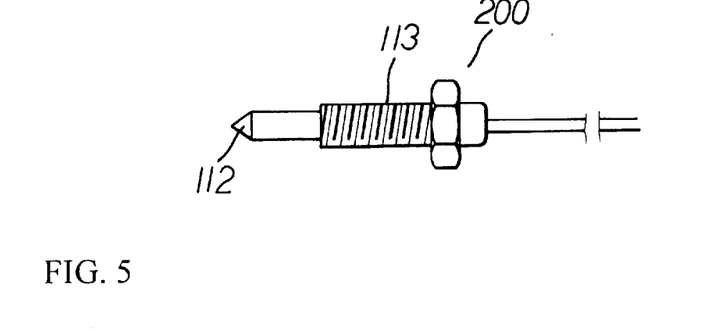
FIG. 5 shows a schematic view of a thermocouple for use in the distribution pump as a brake fluid temperature sensor of the present invention.
Figure 18:
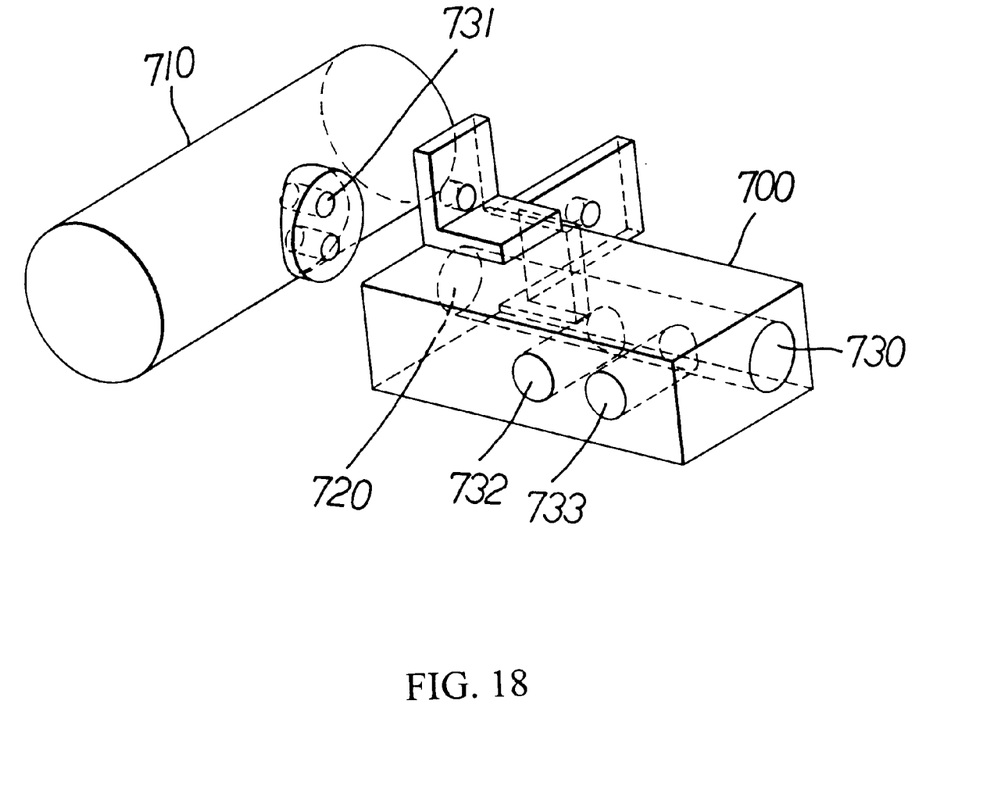
FIG. 18 shows a schematic view showing the location of the advance warning device of the present invention.

The heat generated by the friction between the brake lining piece and the wheel drum or disc can be transmitted to heat the distribution pump to bring about the vaporization of the hydraulic brake fluid which is contained in the distribution pump. As a result, the hydraulic brake fluid contained in the distribution pump becomes compressible such that the hydraulic brake fluid is unable to provide the braking system of the motor vehicle with a sufficient hydraulic pressure. It is therefore necessary to monitor the temperature of the brake fluid. In the present invention, the K-type thermocouple is used as a sensor to monitor the temperature of the brake fluid which is contained in the distribution pump. As shown in FIG. 5, the sensing end of the K-type thermocouple has a conical surface 112 of 120 degrees and threads 113. The sensing end of the K-type thermocouple is located in proximity of the center of the interior of the distribution pump via a fluid discharging hole 731, as shown in FIG. 18, such that the threads 113 of the K-type thermocouple are engaged with the threads of the fluid discharging hole 731, thereby averting the leak of the brake fluid from the fluid discharging hole 731.

In the dynamometer test, it was found that the temperature of the hydraulic brake fluid contained in the distribution pump increased along with an increase in the braking frequency, and that the heat generated in the braking action was indeed imparted to the distribution pump.

The hydraulic braking line is an application of Pascal's principle. When the braking system is operated normally, the chief pump output pressure and the distribution pump pressure are correlated. In the event that the brake fluid line leaks, or that the vaporization of the brake fluid takes place, the chief pump pressure is not able to reach the distribution pump, thereby resulting in the deficiency of the braking power. The pressure is the most sensitive element in the hydraulic brake system. In other word, the brake failure is directly reflected in the changes in the hydraulic pressure. For this reason, the pressure sensor is included in the device of the present invention as one of the indexes for determining the brake failure.

Figure 6:
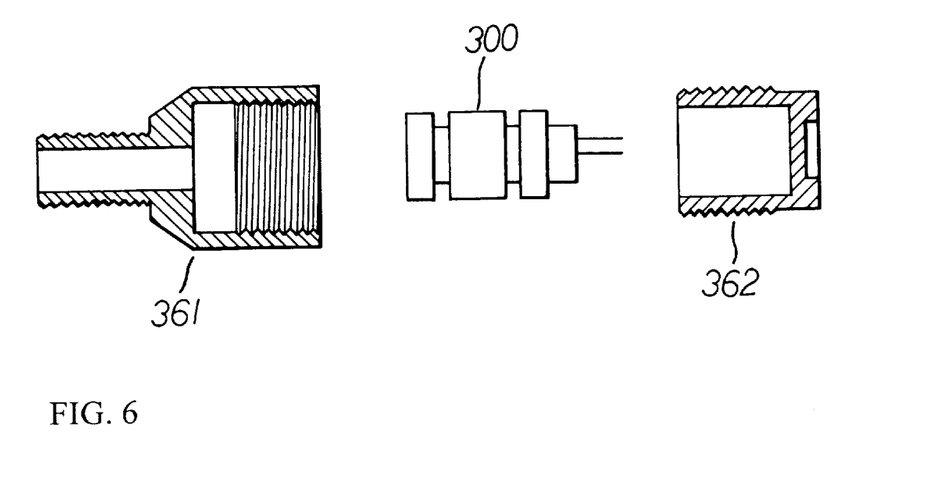
FIG. 6 shows a schematic view of the connection of the pressure sensor of the present invention.

In general, the hydraulic pressure of the automotive vehicle ranges between 750 and 2000 psi, with the highest pressure being in the neighborhood of 3000 psi. The temperature of the operating environment ranges between 80 and 150° C. The pressure sensor used in the present invention is of a dispersion type and is therefore capable of monitoring the pressure with precision. The dispersion-type pressure sensor is often employed in the transmitting device of pressure and differential pressure. As shown in FIG. 6, a conversion joint 361 is engaged with a hydraulic pressure line 732 of FIG. 18 by means of M 10×1.25 outer threads. The pressure sensor 300 is located in a conversion seat 362 such that the pressure sensor 300 is fastened by electron beam welding. The conversion seat 362 is further engaged with the conversion joint 361. As a result, the leak of the hydraulic brake fluid is averted. The hydraulic pressure can be thus guided into the pressure sensor 300.

The hydraulic braking system is composed of a chief pump, a vacuum booster pump, a high pressure line, a distribution pump, and various hydraulic valves. The left wheel and the right wheel of a motor vehicle are equal by design to each other in terms of the distribution pump pressure. However, such an uniformity in the distribution pump pressure can be easily upset by the failure of any one of the component parts referred to above, especially the hydraulic valves which are responsible for adjusting the magnitude of pressure and the differential pressure. The wheels are prone to spin when the wheels are exerted on by the braking forces of different magnitudes.

A motor vehicle in motion is brought to a halt by a friction force (Fb) brought about by the mechanical friction between the brake lining piece and the brake drum or disc, as well as a friction force (Ft) brought about by the friction between the tire treads and the surface of the road. In other words, the braking efficiency is optimal when Fb is equal to Ft. Under such an optimal condition, the skidding of the wheels does not take place. On the other hand, the wheels skid on the road when Fb>Ft. This implies that the wheels are locked up when the brake pedal is applied abruptly and heavily, thereby resulting in the effect of Ft being seriously undermined. When a motor vehicle is cruising normally, Fb is smaller than Ft. As a result, the effective braking action is brought about by Fb when the brake pedal is applied gently by the operator of the motor vehicle. It is therefore readily apparent that the frictional forces (Fb and Ft) play an important role in slowing down or stopping a motor vehicle in motion. The frictional force "Fb" is closely associated with the hydraulic brake fluid, the action of the distribution pump, the design of the braking mechanism, transmission components, the brake lining piece, etc. The variables affecting the friction force "Ft" include the tire treads, the road surface condition, the tire pressure, etc.

Figure 7:
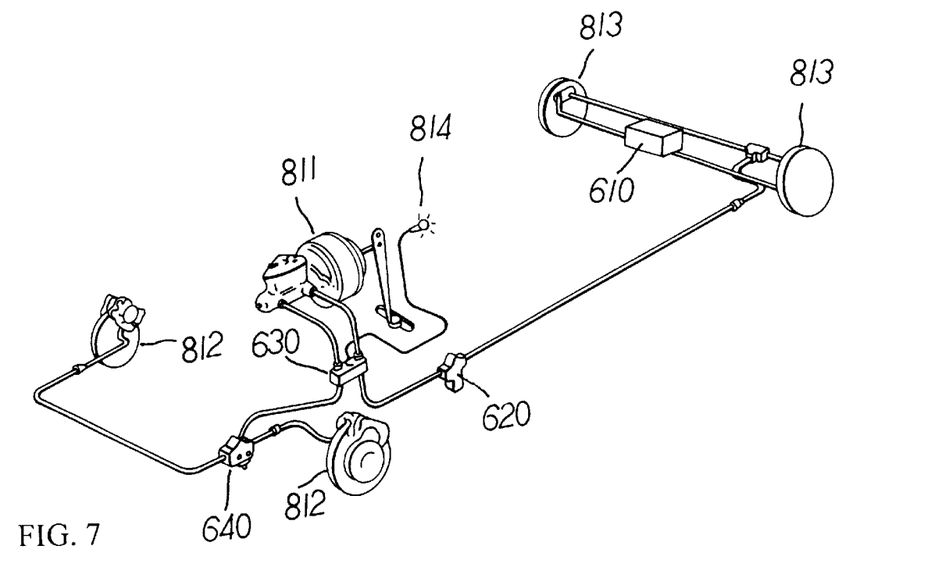
FIG. 7 shows a schematic view of a device for monitoring the pressure imbalance of the left and the right wheels of a motor vehicle.
Figure 8:
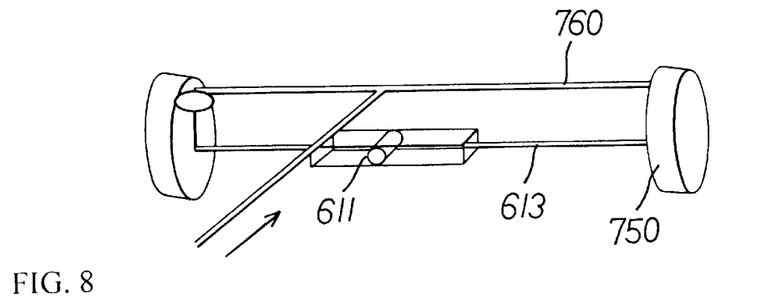
FIG. 8 shows a schematic view of a specific portion of the device for monitoring the pressure imbalance of the left and the right wheels of the motor vehicle.

As shown in FIG. 7, a device designed by the inventor of the present invention is intended to monitor the pressures of the left wheel and the right wheel of a motor vehicle and is composed of a pressure balance sensor 610, a ratio valve 620, a differential pressure valve 630, a metering valve 640, a power braking unit 811, a front disk 812, a rear drum 813, and a brake light 814. The pressure balance sensor 610 is composed of an observation cylinder 611, and a line 613, as shown in FIG. 8. The reference numerals 750 and 760 refer respectively to the wheel and the brake fluid line. The arrow denotes the direction of the hydraulic pressure. As shown in FIG. 7 and 8, the observation cylinder 611 will be in motion as soon as the braking forces exerting on the left wheel and the right wheel are not equal to each other. As a result, the imbalance of the braking forces can be easily detected.

Figure 9:
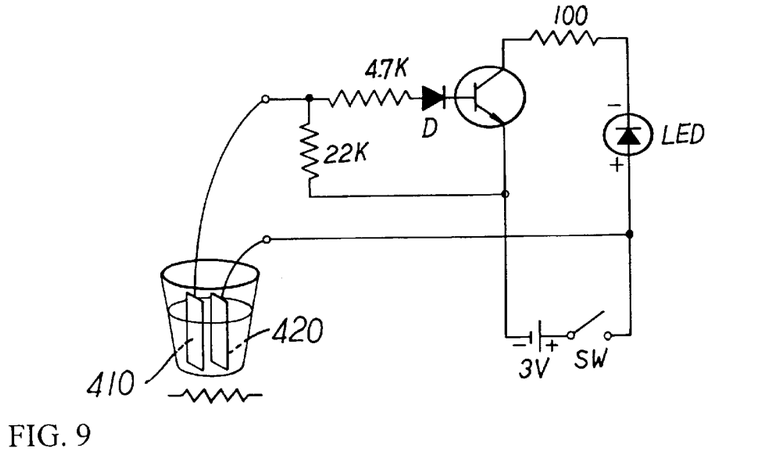
FIG. 9 shows a schematic view of a system for measuring the resistance value of the hydraulic brake fluid.
Figure 10:
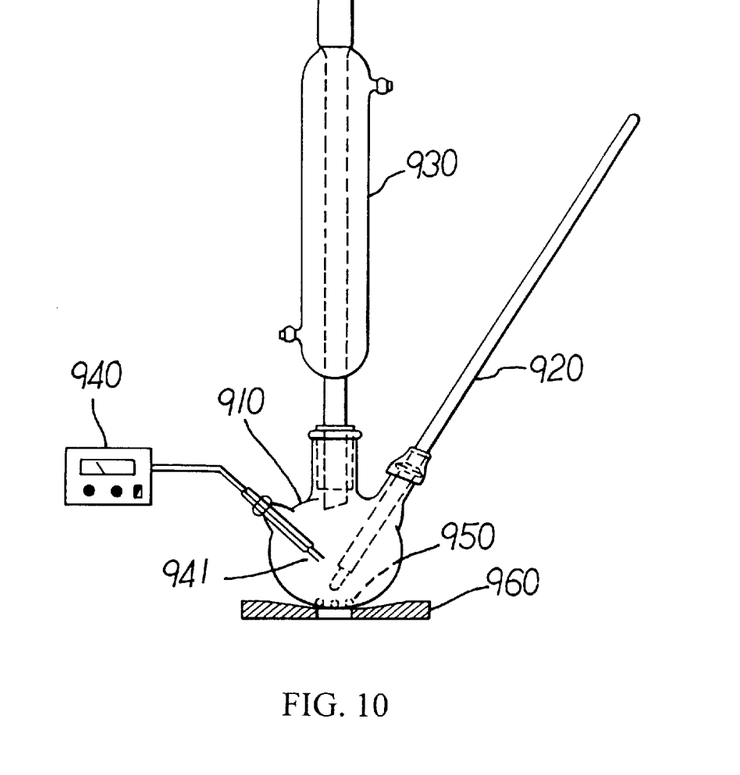
FIG. 10 shows a schematic view of an experimental equipment for correcting the measurement of the resistance value of the hydraulic brake fluid.

The hydraulic brake fluid is a chemical substance highly hydrophilic and is composed of ethylene glycol groups. The hydraulic brake fluid has a high boiling point and hydrogen bonds. As the hydraulic brake fluid is diluted by water, its boiling point is lowered. As a result, the vaporization can take place at the lower temperature to have a negative impact on the braking effectiveness. For this reason, the water content of the hydraulic brake fluid must be monitored and treated as one of the indexes for determining the time at which an advance warning is signaled. The water content sensor of the present invention is of a resistance type, as shown in FIG. 9, and is composed of electrodes 410 and 420, which are immersed in the brake fluid for measuring the resistance. The water content sensor is mounted in the hydraulic pressure line 733, as shown in FIG. 18. In view of the fact that the brake fluid is a substance having a low electrical conductivity, an increase in the water content of the brake fluid can result in an increase in the electrical conductivity of the brake fluid. As a result, the water content of the hydraulic brake fluid can be determined on the basis of the resistance value of the hydraulic brake fluid. With a view to understanding the relationship between the resistance of the brake fluid, the water content of the brake fluid, and the temperature, the inventors of the present invention conducted the experiments, which are described hereinafter. As shown in FIG. 10, the experiments involved the use of a flask 910, a thermometer 920, a condensing tube 930, a resistance meter 940, a probe 941, a plurality of zeolite pebbles 950, and a temperature balancing plate 960.

I. Experiment Items

Experiment 1:

The brake fluids different in water content were used to record the resistance values and the temperature to understand the relationship of the water content, the resistance value and the temperature.

Experiment 2:

The credibility of the resistance value was further examined by a heating-cooling experimental process.

Experiment 3:

The regularity of the resistance value was studied by using a plurality of DOT 4 brake fluids of various brands.

II. Experiment Steps

Experiment 1:

1. preparation of samples for Experiment

Eight sets of samples were established by titration. The samples include DOT 3 water contents 0%, 3%, 5%, 7% (wt) and DOT 4 water contents 0%, 3%, 5%, 7% (wt). They were thoroughly mixed and sealed off to prevent the entry of water.

2. Installation of Equipment for Experiment

All the equipment was installed according to the requirements of SAE in connection with measurement of an equilibrium refluxing boiling point (ERBP). The samples were poured into a specially made flask.

3. Heating and Measuring Resistance Values

The heater was turned on. The measurement of the resistance value was taken at an interval of 20° C. until ERBP was reached.

Experiment 2:

1. The shell (DOT 4) sample was introduced into the flask.

2. The equipment was installed as in Experiment 1.

3. The heater was turned on, whereas the resistance values were measured and recorded every 20° C.

4. The heating was interrupted at ERBP. The sample was allowed to cool at room temperature. The resistance values were measured and recorded at the temperature corresponding to that of the step 3.

Experiment 3:

1. 27 samples were set up by titration. The samples were Agip (DOT 4), Mobil (DOT 4), shell (DOT 4), each of which was prepared by the water contents of 0%, 0.5%, 1.0%, 1.5%, 2.0%, 2.5%, 3.0%, 4.0%, and 5.0%.

2. The resistance values were measured and recorded at 27° C.

III. Equipment of Experiments 1. one titration tube 50 ml.

2. two measuring cylinders 200 ml, two measuring cylinders 100 ml, beakers, titration tubes.

3. one condensing tube, two flasks with three open necks.

4. one heater, one variable resistor.

5. a plurality of probes. The insulated portions of the probes were shielded with the glass tube by blowing so as to enable the probes to withstand the high temperature as high as 260° C.

6. one insulation resistance tester.

IV. Analyses of Experimental Results

Figure 11:
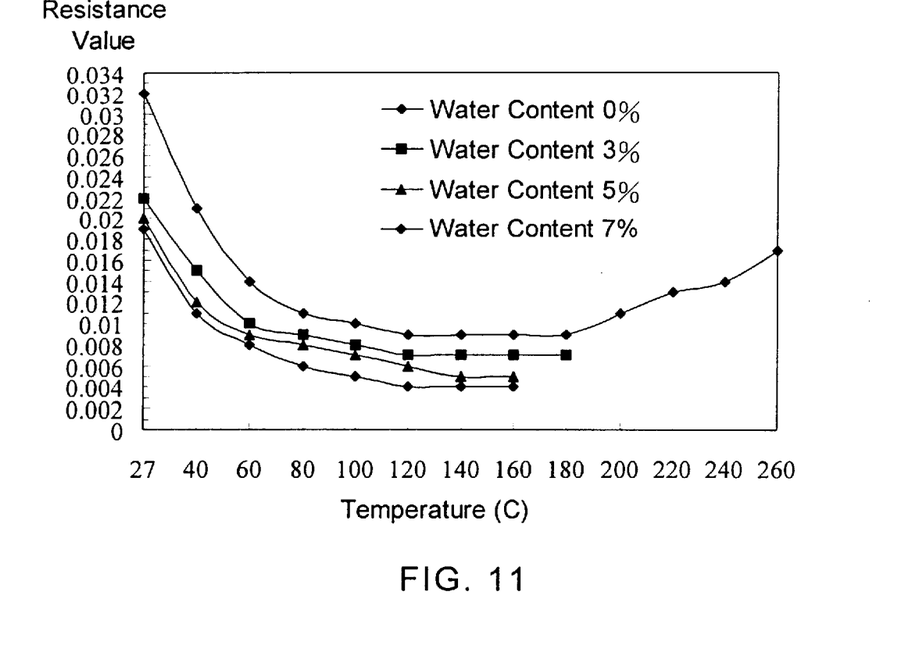
FIG. 11 is a plot showing the relationship between the resistance value and the temperature of the DOT 3 hydraulic brake fluid.
Figure 12:
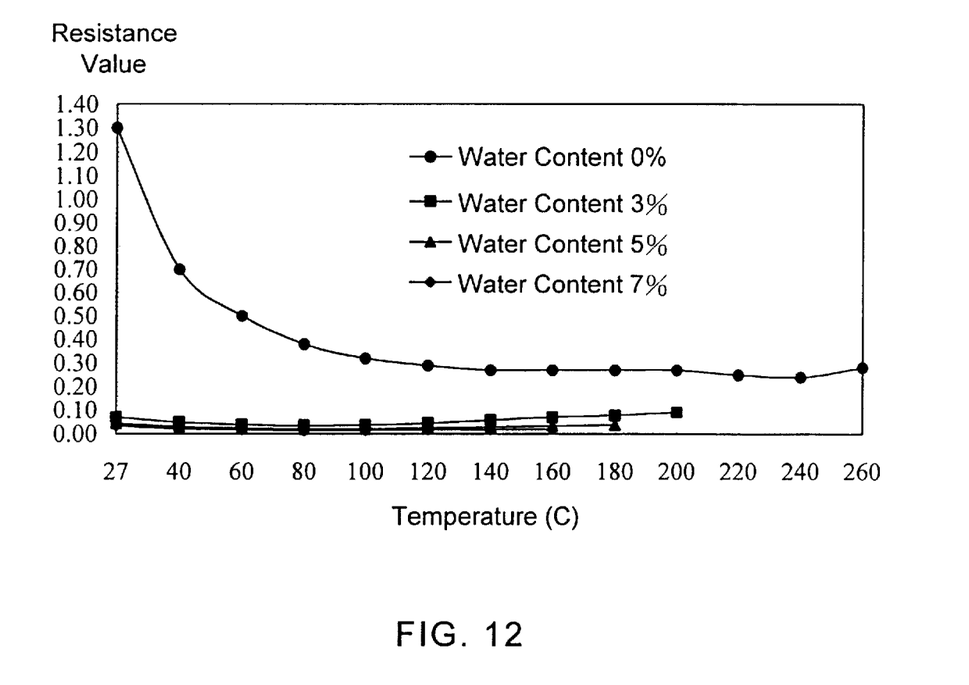
FIG. 12 is a plot showing the relationship between the resistance value and the temperature of the DOT 4 hydraulic brake fluid.

Experiment 1:

The results are shown in FIGS. 11 and 12. The conclusions are as follows:

A. The resistance values decrease as the water contents increase.

B. The ERBP of the brake fluid decreases as the water content increases.

C. At the initial stage of rising temperature, the resistance values decrease drastically, with the rate of change moderating along with an increase in temperature. Between 0% and 3%, the change of DOT 4 was more apparent than DOT 3. The resistance value of DOT 4 was much higher than that of DOT 3.

D. There was a great deal of difference between DOT 3 and DOT 4. There was lack of regularity as to correlation between DOT 3 and DOT 4 in the temperature changing process. The resistance values tended to increase before ERBP was reached, thereby resulting in the analytical complication.

According to the experimental results of Experiment 1, the resistance value of the brake fluid can be changed by the water content and the temperature of the brake fluid. In other words, the water content and the temperature were important factors affecting the resistance value. It is therefore feasible to study the water content and the temperature on the basis of the changes in the resistance value. However, the difficulty of the problem is further deepened by the fact that there is difference between the relationships of the temperature and the resistance value of the same grade and the different grade of the drake fluids. In order to simplify the issue, the temperature factor was excluded such that the measurement and the analysis of the resistance value were done at the normal temperature. That is to say that the measurement of the resistance value by the advance warning device is taken before the temperature has risen at the time when the engine is started. The matter of the water content is of a long-term nature. In other words, the water content is a matter of cumulative effect, which does not call for a constant monitoring. It is therefore reasonable and feasible to simplify the matter.

Figure 13:
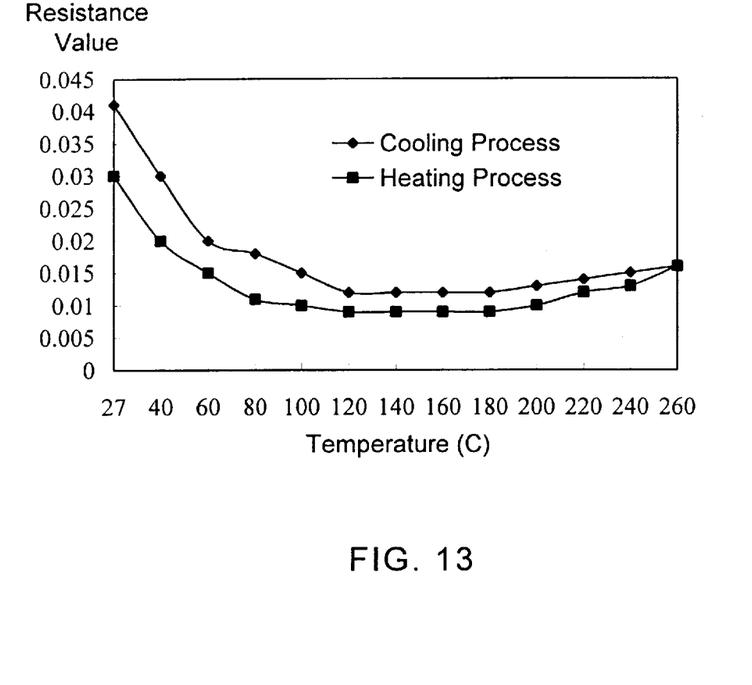
FIG. 13 shows a plot representing the successive changes of the resistance value relative to the temperature in a cooling process, and a line graph representing the successive changes of the resistance value relative to the temperature in a heating process.

Experiment 2:

In order to ensure the credibility of the experiment 1, and to understand further the impact of the disturbance phenomenon on the resistance value at the time of heating, the brake fluid was heated and then cooled. The resistance value was taken separately at the heating process and the cooling process. It took three hours to complete the entire process of heating and cooling. The data are presented as follows. The test sample was a fresh DOT 3 having the water content of 0%. The data are shown in FIG. 13. The heating curve and the cooling curve are not consistent. At the room temperature, there is a great deal of difference in the resistance value. However, the changes are not far apart as a whole. As the temperature rises, the activity of the brake fluid increases, thereby resulting in an increase in the conductivity of the brake fluid. As the temperature rises gradually to reach the saturation, the resistance value rises. The reason that there is such a discrepancy between the resistance values of the heating process and the cooling process is the dissipation of water in the entire process. The heating and the cooling equipments are open systems in contrast to the closed system of the braking system of the motor vehicle. For reason, this phenomenon will not happen in the braking system of the motor vehicle.

Conclusion of Experiments 1 and 2

The temperature parameter was replaced by the normal temperature at which the measurement was taken. There was a great deal of differences between the data of DOT 3 and DOT 4. The distribution of the data of DOT 3 was very close and could not be easily appraised. Most of the brake fluid sold in the market today are of DOT 4 grade. Accordingly, the following experiment 3 was conducted by using the DOT 4 brake fluid as sample.

Experiment 3

Figure 14:
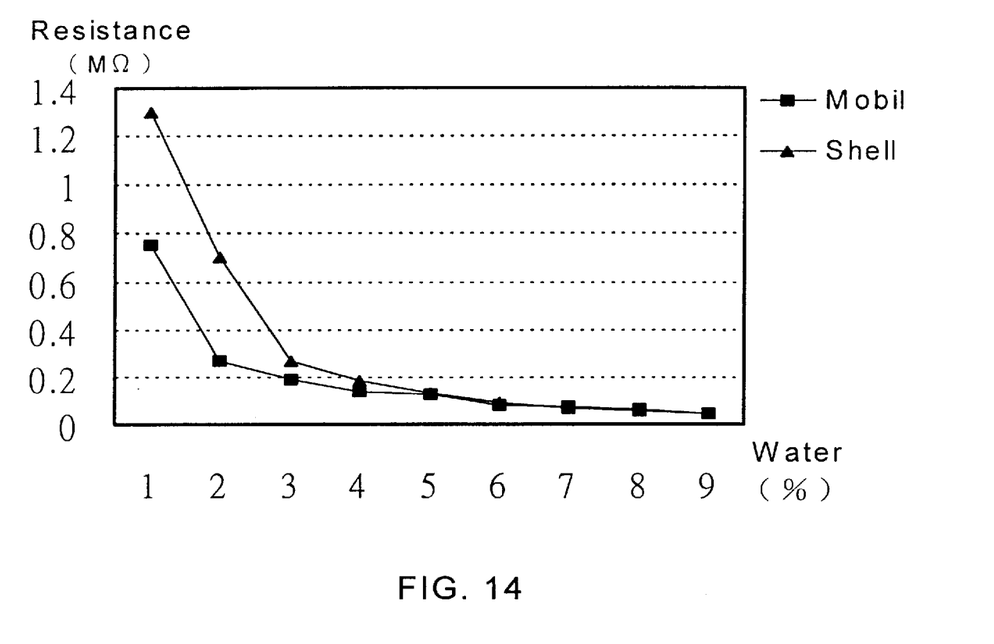
FIG. 14 shows a plot representing the successive changes of the resistance value relative to the successive changes of the water content of a Mobil hydraulic brake fluid at a normal temperature, and of a shell hydraulic brake fluid at the normal temperature.

The samples were brake fluids of Mobil and Shell with the water content being 0%, 0.5%, 1.0%, 1.5%, 2.0%, 2.5%, 3.0% 4.0%, and 5.0%. The test results are shown in FIG. 14.

Even though the samples were of the same grade, the resistance values relative to the water content were not the same the low water content, the difference in the resistance values of different brands was more eminent. On the other hand, such a discrepancy as described above diminished at the high water content. The changes in the resistance value and the water content of the brake fluids of different brands are not consistent. There is no unified standard for reaching a conclusion. However, as far as the water content serving as a safety index is concerned, the smallest difference in the curves may be used as a feasible guide line.

V. Conclusion of Experiments

In light of the above three experiments, it is correct to determine the water content of the brake fluid on the basis of the data of the resistance values of the brake fluid. However, the difficulty is to establish an unified principle that is suitable for brake fluids of various brands. Further research is thus called for.

As far as the water content is concerned, the monitoring is done at the normal temperature in the present invention such that an advance warning is signaled whenever the water content ratio exceeds a predetermined value, and that the change of the brake fluid is required to ensure the safety. The present invention makes use of the resistance values to determine the water content. In addition, certain equipment, such as the probe, is redesigned to miniaturize the system. Under the hydraulic operating system, the probes must be sealed and protected. In addition, the distance between two probes can affect the results of the measurement. In order to enhance the reliability of the probes, the probes must be fastened on a mount. Moreover, the probes must be insulated to enhance the precision and the effectiveness of the probes.

In the present invention, the probes are made of copper and plated with gold to enhance their conductivity. The mount for fastening the probes is plated with a thickness of 0.05 mm of aluminum oxide such that the resistance value of the mount can reach as high as 30MΩ. As a result, the mount and the probes are effectively separated from each other such that the mount does not interfere with the probes. The mount is provided with a fastening hole for fastening a tapered end of the probe in conjunction with a sealing glue. Moreover, the fastening hole is sealed with epoxy resin which is nonconductive, resistant to corrosion and heat as high as 150° C.

Figure 15:
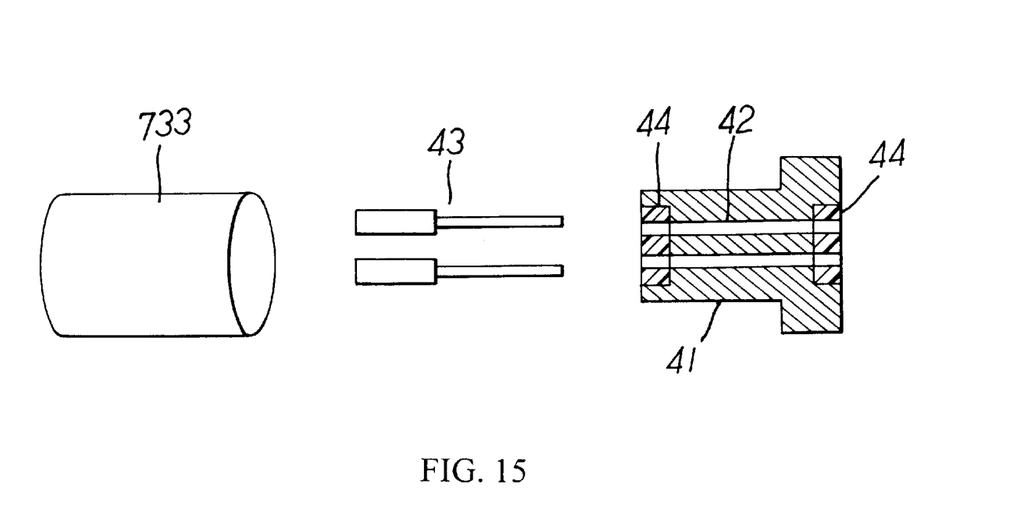
FIG. 15 shows a schematic view of a resistance probe of the water content sensor of the present invention.

As shown in FIG. 15, a water content sensor 40 embodied in the present invention is composed of a mount 41 of an aluminum oxide material having two fastening holes 42 for fastening two probes 43 which are made of copper and plated with gold. The mount 41 is provided with threads for engaging a hydraulic line 733. Both ends of the fastening holes 42 are sealed off with epoxy resin 44.

Figure 16:
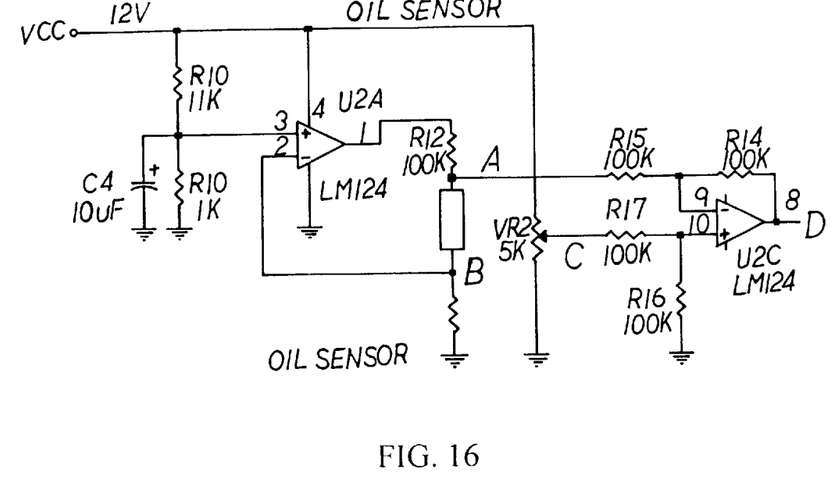
FIG. 16 shows a circuitry for measuring the resistance value of the hydraulic brake fluid.

As shown in FIG. 16, a water content circuit has A and B points which represent the two probes. The probes are immersed in the brake fluid with 0% water content for measuring the voltage value at the A point. The variable resistance VR2 is adjusted such that the voltage value of the C point is equal to that of the A point. The probes are then immersed in the brake fluid containing water, the voltage value of the A point will change and is then subtracted from the voltage value of the C point before being amplified and sent out from the D point. It is therefore apparent that the A point voltage value is prone to change in accordance with the change in the water content of the brake fluid, and that the amplified signal from the D point is able to reflect this change.

Figure 17:
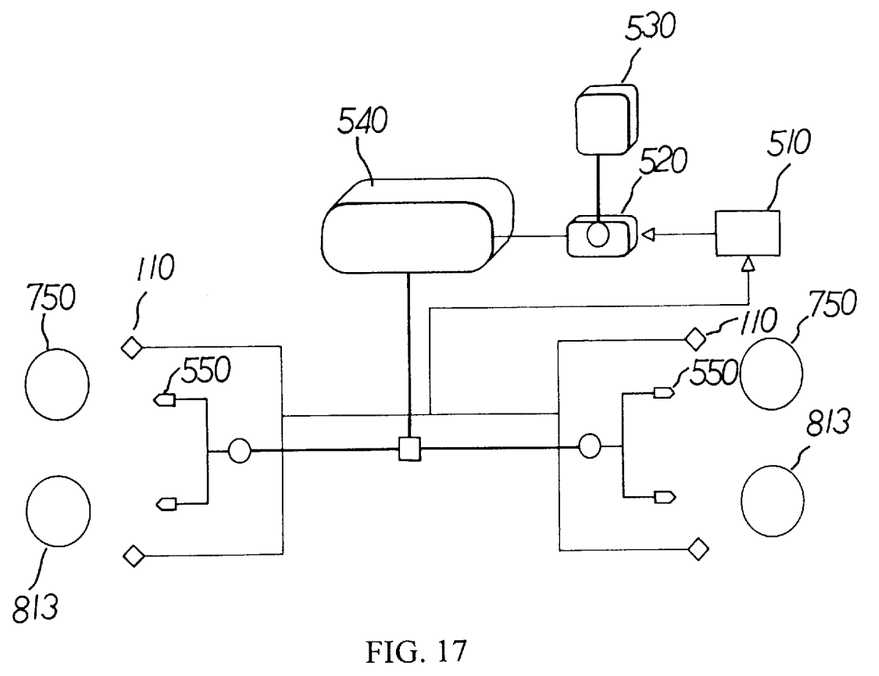
FIG. 17 shows a schematic view of the sprinkling system of the present invention.

No matter how refined the design of the brake drum or disk is, the overheating is bound to take place if the brake is applied in an excessive frequency, thereby resulting in the brake failure. The sprinkling systems of various forms may be helpful; nevertheless they are by no means panacea. The conventional sprinkling systems are operated sporadically or continuously by the operator of the motor vehicle in accordance with the operator's judgment, and are therefore rather primitive at best. The present invention is provided with an advanced sprinkling system, as shown in FIG. 17, the sprinkling system of the present invention is composed of a sensor 110 for monitoring the temperature of the brake lining piece at work, a controller 510, an electromagnetic valve 520, an air pressure source 530, a cooling water reservoir 540, and a nozzle 550. The reference numerals 750 and 813 denote a wheel and a brake drum. The signals transmitted continuously by the sensor 110 are received by the controller 510 for determining the time when the electromagnetic valve 520 is actuated, such that the pressure from the air pressure source 530 is allowed to enter so as to force the cooling water kept in the reservoir 540 into the nozzle 550 to sprinkle the overheated wheel 750 and the brake drum 813. The sprinkling action is automatically terminated when the wheel 750 and the brake drum 813 are no longer in the over-heated state. Such "termination" signal is transmitted by the sensor 110 and subsequently received by the controller 510. In addition, the sprinkling system of the present invention is provided with a water level sensor for monitoring the level of water contained in the reservoir 540.

The advance warning device of the present invention is miniaturized by taking the following factors into consideration.

1. The volume of the device is smaller than $10^3$ cm$^3$.
2. The way that the component parts are joined with the main body.
3. The layout of various sensors is arranged strategically in the light of overall available space.
4. The way that the main body and the distribution pump are connected and fastened.
5. The junctures are sealed off securely.
6. The device can be easily operated and maintained.
7. The device is an add-on without having to alter the original construction of the braking system.

For the layout of the device of the present invention, please refer to FIG. 18. The present invention is composed of a main body 700 of a stainless steel material. The main body 700 is provided with a plurality of ports 732, 733, 720 and 730 for connecting the pressure sensor, the resistance meter, the distribution pump 710, and the brake fluid line. The distribution pump 710 is provided with a fluid discharging port 731 via which the K-type thermocouple is inserted into the interior of the distribution pump 710 for measuring the temperature of the brake fluid.

What is claimed is:

1. An advance warning device for monitoring the working conditions of a hydraulic braking system of a motor vehicle, said advance warning device comprising:

a brake lining temperature sensor for monitoring the temperature of a brake lining piece of the hydraulic braking system of the motor vehicle;

a distribution pump temperature sensor for monitoring the temperature of hydraulic brake fluid contained in a distribution pump of the hydraulic braking system of the motor vehicle;

a water content sensor for monitoring water content of the hydraulic brake fluid of the hydraulic braking system of the motor vehicle;

a hydraulic pressure sensor for monitoring the hydraulic pressure of hydraulic brake fluid of the hydraulic braking system of the motor vehicle, said hydraulic pressure sensor including a sensing end which is located in proximity to a fluid inlet of a distribution pump of the hydraulic system of the motor vehicle such that said sensing end of said hydraulic pressure sensor is in contact with hydraulic brake fluid; and a controller for receiving signals transmitted by said sensors, said signals being compared by said controller with advance warning data stored in a memory which is located inside or outside said controller, wherein said advance warning data includes advance warning hydraulic pressure signal data, and p1 wherein said controller includes an input end and an output end, said input end being connected with a signal output end of said hydraulic pressure sensor for receiving a hydraulic pressure signal of the hydraulic brake fluid transmitted by said hydraulic pressure sensor such that said hydraulic pressure signal is compared by said controller with said advance warning hydraulic pressure signal data.

2. The device as defined in claim 1, wherein said brake lining temperature sensor is a thermocouple.

3. The device as defined in claim 2, wherein said brake lining temperature sensor is a K-type thermocouple.

4. The device as defined in claim 1, wherein said water content sensor is a resistance-type water content sensor.

5. The device as defined in claim 1, wherein said distribution pump temperature sensor is a thermocouple.

6. The device as defined in claim 5, wherein said distribution pump temperature sensor is a K-type thermocouple.

7. The device as defined in claim 1 further comprising a sprinkling system, said sprinkling system having a signal receiving end connected with said controller for receiving a signal transmitted by said controller to sprinkle an overheated wheel or brake drum of the motor vehicle.

8. An advance warning device for monitoring the working conditions of a hydraulic braking system of a motor vehicle, said advance warning device comprising:

a brake lining temperature sensor having a sensing end which is in contact with a brake lining piece of the hydraulic braking system of the motor vehicle said brake lining piece including a friction surface and a metal plate situated on a bottom surface of the brake lining piece opposite the friction surface, said metal plate and brake lining piece including a recess, and said brake lining temperature sensor including:

a metal heat conductive member disposed within said recess and having a rivet shape, said rivet shape preventing the heat conductive member from being displaced to move toward the friction surface by a vibration force generated during a braking action;

a thermocouple welded to the heat conductive member; and a reinforcing material arranged to cover a head of said rivet shape and fill said recess to thereby enclose said metal heat conductive member and thermocouple within said recess and prevent the heat conductive member and thermocouple from being separated from the brake lining piece; and a controller having an input end and an output end, with said input end being connected with a signal output end of said brake lining temperature sensor for receiving a temperature signal transmitted by said brake lining temperature sensor such that said temperature signal is compared by said controller with advance warning data stored in a memory which is located inside or outside said controller.

9. The device as defined in claim 8 further comprising a sprinkling system, said sprinkling system having a signal receiving end connected with said controller for receiving a signal transmitted by said controller to sprinkle an overheated wheel or brake drum of the motor vehicle.

10. An advance warning device for monitoring the working conditions of a hydraulic braking system of a motor vehicle, said device comprising:

a water content sensor having a sensing end which is in contact with hydraulic brake fluid of the hydraulic braking system of the motor vehicle;

a comparator arranged to compare a voltage at said sensing end with a reference voltage and generate a voltage signal in response to changes in said voltage; and a controller having an input end and an output end, with said input end being connected with said comparator for receiving said voltage signal and comparing said voltage signal with advance warning voltage signal data stored in memory which is located inside or outside said controller.

11. The device as defined in claim 10 further comprising a sprinkling system, said sprinkling system having a signal receiving end connected with said controller for receiving a signal transmitted by said controller to sprinkle an overheated wheel or brake drum of the motor vehicle.

12. An advance warning device for monitoring the working conditions of a hydraulic braking system of a motor vehicle, said device comprising:

a distribution pump temperature sensor having a sensing end which is in contact with hydraulic brake fluid kept in a distribution pump of the hydraulic braking system of the motor vehicle; and a controller having an input end and an output end, with said input end being connected with a signal output end of said distribution pump temperature sensor for receiving a temperature signal of the hydraulic brake fluid transmitted by said distribution pump sensor such that said temperature signal of the hydraulic brake fluid is compared by said controller with advance warning data stored in a memory which is located inside or outside said controller.

13. The device as defined in claim 12 further comprising a sprinkling system, said sprinkling system having a signal receiving end connected with said controller for receiving a signal transmitted by said controller to sprinkle an overheated wheel or brake drum of the motor vehicle.

14. An advance warning device for monitoring the working conditions of a hydraulic braking system of a motor vehicle, said advance warning device comprising:

a brake lining temperature sensor for monitoring the temperature of a brake lining piece of the hydraulic braking system of the motor vehicle, said brake lining piece including a friction surface and a metal plate situated on a bottom surface of the brake lining piece opposite the friction surface, said metal plate and brake lining piece including a recess, and said brake lining temperature sensor including:

a metal heat conductive member disposed within said recess and having a rivet shape, said rivet shape preventing the heat conductive member from being displaced to move toward the friction surface by a vibration force generated during a braking action;

a thermocouple welded to the heat conductive member; and a reinforcing material arranged to cover a head of said rivet shape and fill said recess to thereby enclose said metal heat conductive member and thermocouple within said recess and prevent the heat conductive member and thermocouple from being separated from the brake lining piece; and a distribution pump temperature sensor for monitoring the temperature of hydraulic brake fluid contained in a distribution pump of the hydraulic braking system of the motor vehicle;

a water content sensor for monitoring water content of the hydraulic brake fluid of the hydraulic braking system of the motor vehicle;

a hydraulic pressure sensor for monitoring the hydraulic pressure of hydraulic brake fluid of the hydraulic braking system of the motor vehicle; and a controller for receiving signals transmitted by said sensors, said signals being compared by said controller with advance warning data stored in a memory which is located inside or outside said controller.

15. An advance warning device for monitoring the working conditions of a hydraulic braking system of a motor vehicle, said advance warning device comprising:

a brake lining temperature sensor for monitoring the temperature of a brake lining piece of the hydraulic braking system of the motor vehicle;

a distribution pump temperature sensor for monitoring the temperature of hydraulic brake fluid contained in a distribution pump of the hydraulic braking system of the motor vehicle;

a water content sensor for monitoring water content of the hydraulic brake fluid of the hydraulic braking system of the motor vehicle;

a comparator arranged to compare a voltage at said sensing end with a reference voltage and generate a voltage signal in response to changes in said voltage a hydraulic pressure sensor for monitoring the hydraulic pressure of hydraulic brake fluid of the hydraulic braking system of the motor vehicle; and a controller for receiving signals transmitted by said sensors, said signals being compared by said controller with advance warning data stored in a memory which is located inside or outside said controller, wherein said advance warning data includes advance warning voltage signal data, and wherein said controller includes an input end and an output end, said input end being connected with said comparator for receiving said voltage signal and comparing said voltage signal with said advance warning voltage signal data.

16. An advance warning device for monitoring the working conditions of a hydraulic braking system of a motor vehicle, said advance warning device comprising:

a brake lining temperature sensor for monitoring the temperature of a brake lining piece of the hydraulic braking system of the motor vehicle;

a distribution pump temperature sensor for monitoring the temperature of hydraulic brake fluid contained in a distribution pump of the hydraulic braking system of the motor vehicle;

a water content sensor for monitoring water content of the hydraulic brake fluid of the hydraulic braking system of the motor vehicle;

a hydraulic pressure sensor for monitoring the hydraulic pressure of hydraulic brake fluid of the hydraulic braking system of the motor vehicle;

a pressure balance monitoring sensor for measuring a pressure balance between left and right wheels of the motor vehicle, said pressure balance monitoring sensor including an observation cylinder arranged to move as a result of imbalances in braking forces applied to said left and right wheels, and a controller for receiving signals transmitted by said sensors, said signals being compared by said controller with advance warning data stored in a memory which is located inside or outside said controller.

* * * * *